(12) United States Patent
Oh et al.

(10) Patent No.: US 11,123,659 B2
(45) Date of Patent: Sep. 21, 2021

(54) SLUDGE COLLECTOR

(71) Applicants: LINKON TECHNOLOGY CO., LTD., Seongnam-si (KR); Jeong Hun Oh, Seongnam-si (KR)

(72) Inventors: Jeong Hun Oh, Seongnam-si (KR); Jin Hwan Oh, Seongnam-si (KR)

(73) Assignees: LINKON TECHNOLOGY CO., LTD., Seongnam-si (KR); Jeong Hun Oh, Seongnam-si (KR)

( * ) Notice: Subject to any disclaimer, the term of this patent is extended or adjusted under 35 U.S.C. 154(b) by 0 days.

(21) Appl. No.: 16/824,789

(22) Filed: Mar. 20, 2020

(65) Prior Publication Data

US 2020/0215461 A1    Jul. 9, 2020

Related U.S. Application Data

(63) Continuation of application No. PCT/KR2018/015498, filed on Dec. 7, 2018.

(30) Foreign Application Priority Data

Dec. 14, 2017    (KR) ........................ 10-2017-0172035

(51) Int. Cl.
| | | |
|---|---|---|
| *B01D 21/18* | (2006.01) | |
| *B01D 21/20* | (2006.01) | |
| *B01D 21/04* | (2006.01) | |
| *B01D 21/24* | (2006.01) | |
| *C02F 11/121* | (2019.01) | |

(52) U.S. Cl.
CPC ............. *B01D 21/20* (2013.01); *B01D 21/04* (2013.01); *B01D 21/18* (2013.01); *B01D 21/245* (2013.01); *B01D 21/2455* (2013.01); *C02F 11/121* (2013.01)

(58) Field of Classification Search
CPC ........ B01D 21/04; B01D 21/12; B01D 21/18; B01D 21/20; B01D 21/22; B01D 21/245; B01D 21/2455
USPC ......................................... 210/525, 526, 803
See application file for complete search history.

(56) References Cited

U.S. PATENT DOCUMENTS

| | | | | |
|---|---|---|---|---|
| 5,056,651 A | * | 10/1991 | Nagamatsu ............ | B01D 21/20 198/725 |
| 5,460,727 A | * | 10/1995 | Davis ..................... | B01D 21/18 210/525 |
| 5,620,601 A | * | 4/1997 | Wilcher ................. | B01D 21/18 210/526 |

FOREIGN PATENT DOCUMENTS

| | | |
|---|---|---|
| JP | 59-162915 A | 9/1984 |
| JP | 63-051606 U | 4/1988 |
| JP | 06-004884 Y2 | 2/1994 |

(Continued)

OTHER PUBLICATIONS

International Search Report (PCT/KR2018/015498), WIPO, dated Mar. 11, 2019.

(Continued)

*Primary Examiner* — Christopher Upton
(74) *Attorney, Agent, or Firm* — Patent Office of Dr. Chung Park (57) ABSTRACT

The present disclosure relates to a sludge collector including: a plurality of flights collecting sludge in a settling basin; a chain connected to the plurality of flights to move the flights; and an attachment-integrated roller unit detachably coupled to an attachment connected to the flights, and preventing the flights from being reversed when the flights are operated.

9 Claims, 11 Drawing Sheets

(56) References Cited

FOREIGN PATENT DOCUMENTS

| | | |
|---|---|---|
| JP | 08-010352 Y2 | 3/1996 |
| JP | 2016-209817 A | 12/2016 |
| KR | 20-0426834 Y1 | 9/2006 |
| KR | 10-1285197 B1 | 7/2013 |
| KR | 10-1778733 B1 | 9/2017 |

OTHER PUBLICATIONS

Korean Office Action (KR 10-2017-0172035), KIPO, dated May 21, 2019.
Korean Notice of Allowance (KR 10-2017-0172035), KIPO, dated Nov. 20, 2019.

* cited by examiner

SLUDGE COLLECTOR

REFERENCE TO RELATED APPLICATIONS

This is a continuation of pending International Patent Application PCT/KR2018/015498 filed on Dec. 7, 2018, which designates the United States and claims priority of Korean Patent Application No. 10-2017-0172035 filed on Dec. 14, 2017, the entire contents of which are incorporated herein by reference.

FIELD OF THE INVENTION

The present disclosure relates to a sludge collector, and more particularly, to a sludge collector that may maintain an alignment state of a chain by effectively preventing a flight from being reversed, not only improve durability of the chain, but also save power by reducing an operating load of the chain and improving a shearing force thereof, which may allow the chain to achieve maximum performance and ensure stable operation, and also provide a faster construction period than conventional sludge collector and solve all the problems caused by deformation of a wear strip by eliminating a work of constructing the wear strip on a bottom.

BACKGROUND OF THE INVENTION

A non-metallic conveyor chain made of a composite material or a high-strength engineering plastic is applied to a variety of industries, such as a water treatment facility for water and sewage treatment and an oil refinery, or seawater desalination, and is primarily applied to the transport of highly abrasive materials such as sand, sludge and slag.

As a representative example, the water treatment facility for water and sewage treatment will be described. A typical water treatment facility includes a floating matter removal step of removing floating matters in raw water introduced from homes or industrial sites, and decomposition and precipitation step using an activated sludge.

For a supernatant filtered in the decomposition and precipitation step, a process of passing through an activation step in which oxygen is supplied from an aeration tank to propagate aerobic bacteria, re-separating the supernatant in a secondary settling basin, and then disinfecting the top grade water that has passed through a tertiary settling basin or filter bed again to discharge the disinfected top grade water into a stream is performed.

In the water treatment facility including such a process flow, sludge (precipitate or foam) is generated during removal of the floating matters in the raw water and decomposition of wastewater using the activated sludge, and a sludge collector is used to remove or collect such sludge.

At present, various types of sludge collectors exist, but a chain flight type sludge collector is known to be most widely used. In the chain flight type sludge collector, a conveyor chain is applied as a means for moving a flight.

A specification of the settling basin is not standardized by treatment capacity and varies from as large as 16 m to as small as 2 m, and accordingly, the flight is also variously supplied with the specification ranging from 150 mm to 360 mm, and a width ranging from 15 m to as long as 120 m.

Meanwhile, in an existing chain flight type sludge collector in a small settling basin, the two-row chain flight method with two rows of chains is most common. This is designed to collect the sludge while allowing the flight to hang onto the two rows of chains disposed to be spaced apart from each other and move.

As such, this is not a problem for the small settling basin, but in a large settling basin with widths of 7 to 15 m and lengths of 20 to 100 m, since frequent breakage of the chain and breakage due to sag of flight may frequently occur during operation, various methods for solving such a problem, for example, various methods such as applying the chain as a non-metallic chain and the like have been proposed.

However, an existing non-metallic conveyor chain is exposed to various problems due to material or structural limitations.

First, when the flight transports the sludge generated by gravity settling, the flight may be loaded by a full width of the flight, which causes a problem that the flight is reversed.

Second, since a load of the flight, that is, the weight of the flight and a load of gravity settled sludge are configured to purely withstand by only a tensile force of the chain, there is a problem that the durability of the parts is deteriorated.

Third, when the flight is transported on a lower portion, the flight is transported at a certain distance from the bottom by a shoe attached to the flight and a wear strip attached to the bottom of the settling basin, and in this case, since a friction force is generated between the flight, the shoe, and the wear strip, there is a problem in that the durability of the parts is deteriorated.

Fourth, the wear strip of the bottom and the wear strip of a return rail may be deformed by friction between the shoe of the flight and the wear strip and by wastewater, sewage, and petrochemical wastewater, thereby causing the flight being transported to be caught and broken. In this case, the flight should be replaced. When replacing the wear strips installed in two or three rows in a length direction of the settling basin, water in the settling basin needs to be completely drained, and a large number of anchors need to be constructed at the bottom to re-install the wear strips. Therefore, during such work, there is a problem that the treatment plant operation needs to be stopped.

SUMMARY OF THE INVENTION

An aspect of the present disclosure may provide a sludge collector that may maintain an alignment state of a chain by effectively preventing a flight from being reversed, not only improve durability of the chain, but also save power by reducing an operating load of the chain and improving a shearing force thereof, which may allow the chain to achieve maximum performance and ensure stable operation, and also provide a faster construction period than a conventional sludge collector and solve all the problems caused by deformation of a wear strip by eliminating a work of constructing the wear strip on a bottom.

According to an aspect of the present disclosure, a sludge collector includes: a plurality of flights collecting sludge in a settling basin; a chain connected to the plurality of flights to move the flights; and an attachment-integrated roller unit detachably coupled to an attachment connected to the flights, and preventing the flights from being reversed when the flights are operated.

The attachment-integrated roller unit may include: a first roller capable of performing rolling movement; a first roller shaft which forms a rotation shaft center of the first roller and is coupled to a first shaft coupling portion of the attachment; a pair of first bushings coupled to both ends of the first roller; and a first shaft fixing member coupled to the first shaft coupling portion, preventing the first roller shaft from being separated from the first shaft coupling portion, and preventing of a rotation of the first roller shaft.

The first roller may be made of a urethane elastic body, and the first roller shaft may include: a first shaft body having a circular cross-sectional shape disposed inside the first roller to form the rotation shaft center of the first roller; and a pair of first coupling ends having a non-circular cross-sectional shape formed at both ends of the first shaft body.

The first shaft fixing member may include: a first fixing plate formed to be wider than an opening width of the first shaft coupling portion and disposed in the first shaft coupling portion; a pair of first hooks extending from the first fixing plate, elastically provided by a gap formed therein, and disposed at an inlet of the first shaft coupling portion; and a first engagement protrusion formed on the first hook and coupled to a first engagement groove of the first shaft coupling portion.

The sludge collector may further include a plurality of carrier roller units guiding an operation of the flights, together with the attachment-integrated roller unit when the flights are operated.

The carrier roller unit may include: a detachable unit bracket detachably coupled to one side of the flights; a second roller capable of performing rolling movement; a second roller shaft which forms a rotation shaft center of the second roller and is coupled to a second shaft coupling portion of the detachable unit bracket; a pair of second bushings coupled to both ends of the second roller; and a second shaft fixing member coupled to the second shaft coupling portion.

The detachable unit bracket may be provided with a plurality of bracket pockets, and the flight may be provided with a plurality of pocket supports coupled to and supported by the plurality of bracket pockets.

The sludge collector may further include at least one carrier roller unit coupled to the flights in close proximity to the attachment-integrated roller unit to guide the operation of the flights, together with the attachment-integrated roller unit when the flights are operated.

A return rail guide may be provided to prevent derailment of the return roller unit driving on the return rail.

The return rail guide may be provided separately from the return roller unit and inserted into a corresponding position at the time of assembly so that the return rail guide may be fixed together to a fixing bolt of the return roller unit or may be provided integrally with the return roller unit.

When a width of the settling basin is excessively wide, in order to prevent sagging of the flight while preventing power loss by friction with a bottom due to the sagging of the flight, the carrier roller units may be disposed on the center, front surface, and rear surface of the flight, respectively.

A wear strip may be further installed on a bottom surface of the settling basin.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE INVENTION

Hereinafter, exemplary embodiments of the present disclosure will be described with reference to the accompanying drawings.

Figure 1:
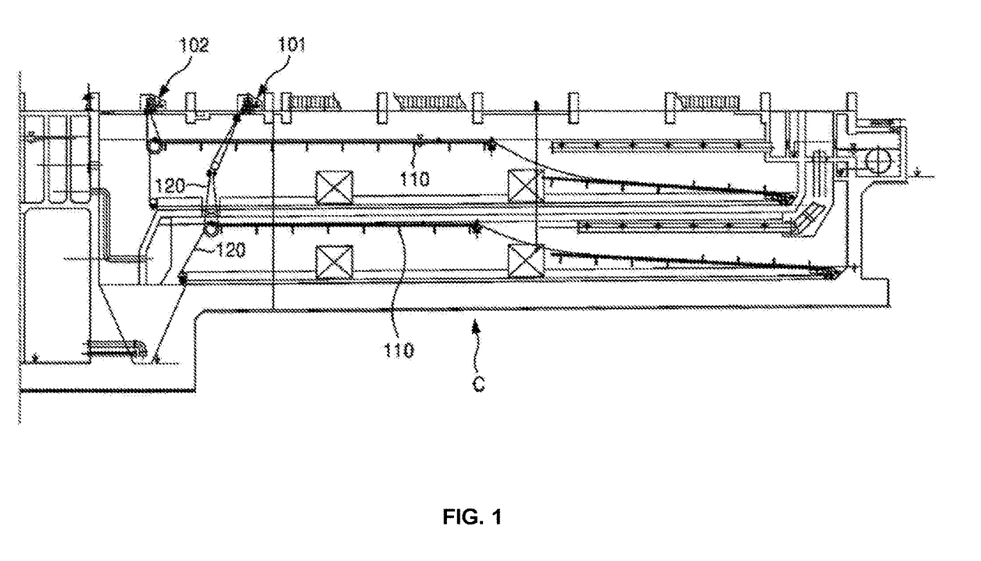
FIG. 1 is a structural view of a chain flight type sludge collector according to an embodiment of the present disclosure.
Figure 2:
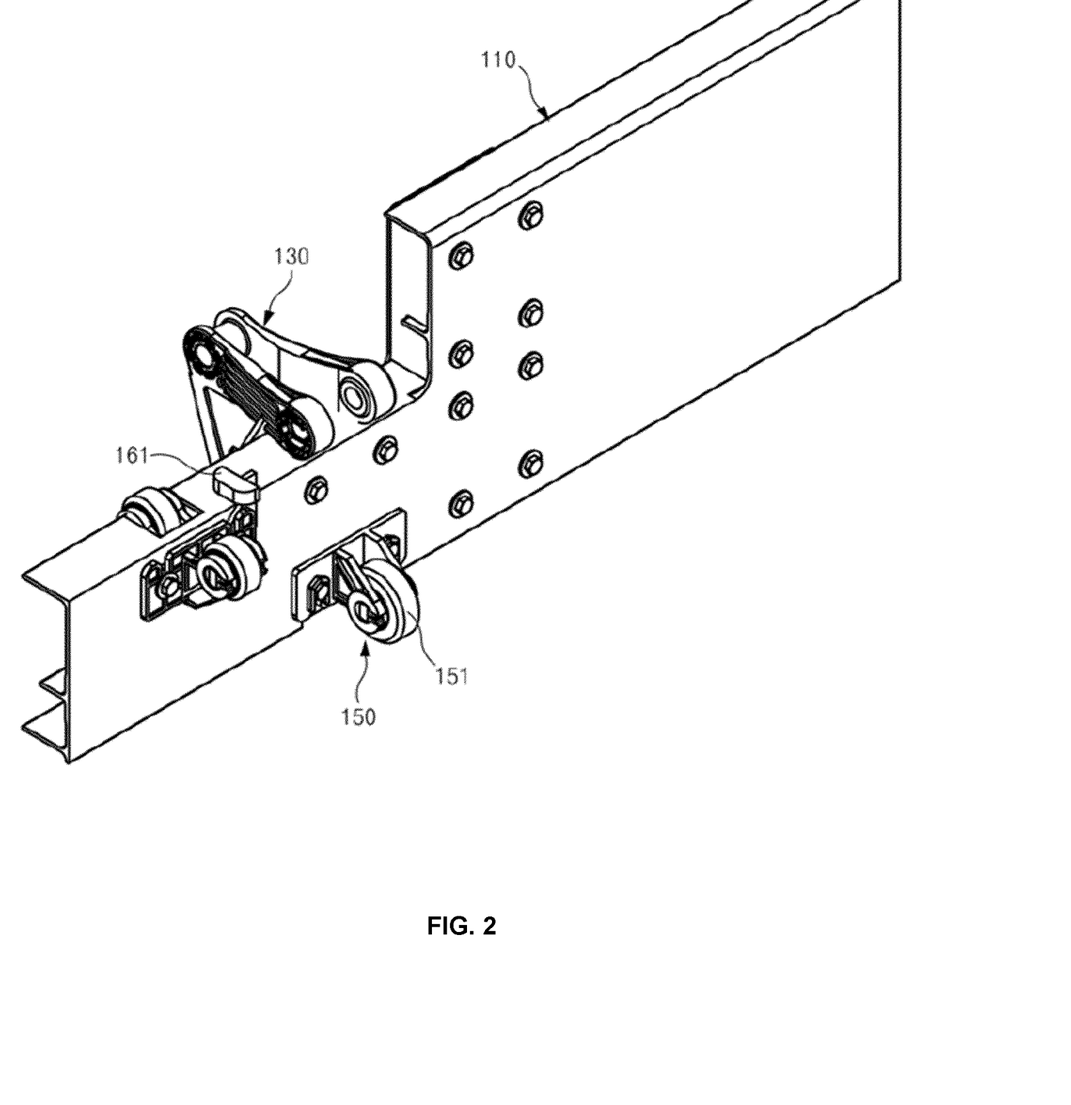
FIG. 2 is a perspective view of a state in which an attachment-integrated roller unit and a carrier roller unit are coupled to a flight.
Figure 3:
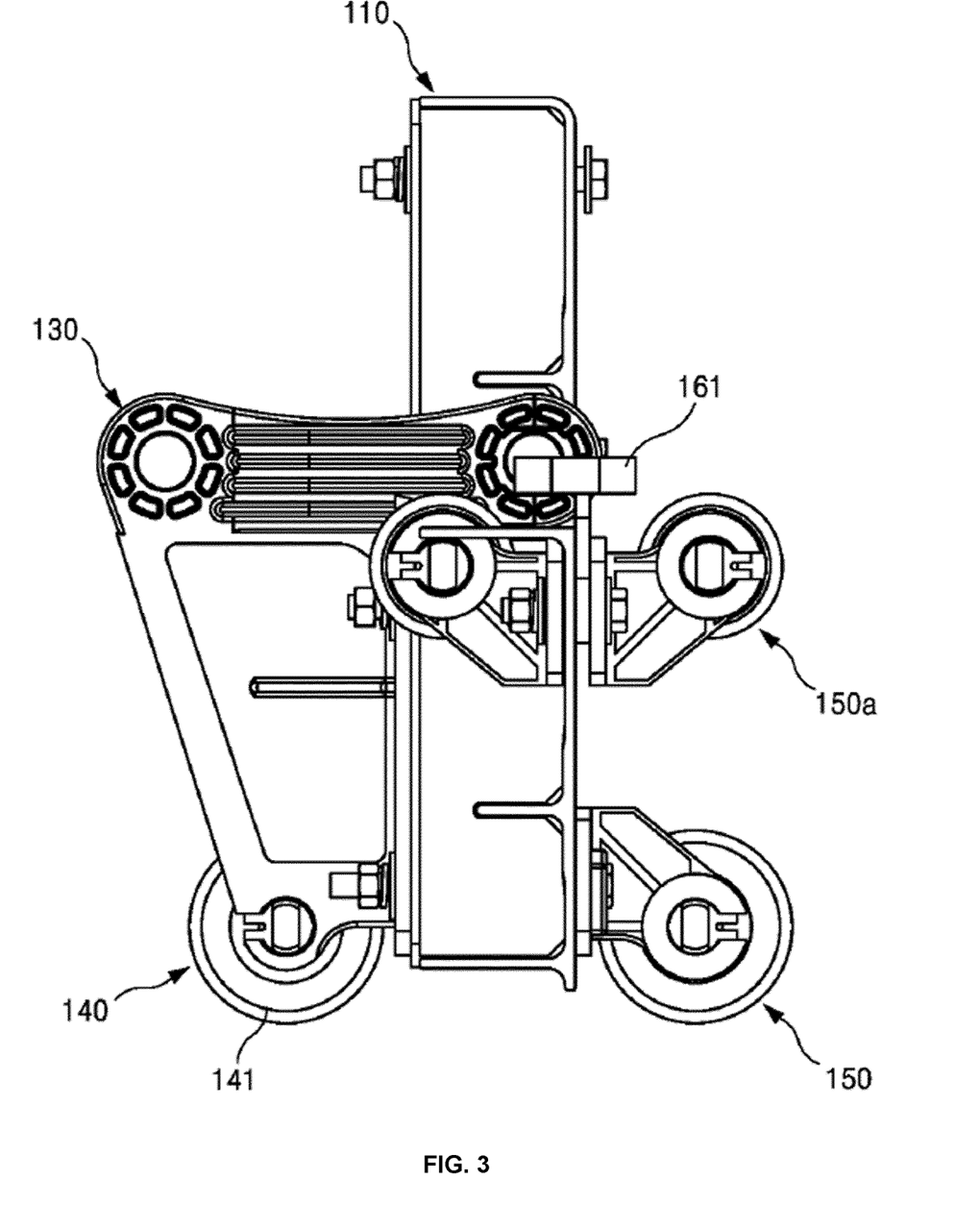
FIG. 3 is a side view of FIG. 2.
Figure 4:
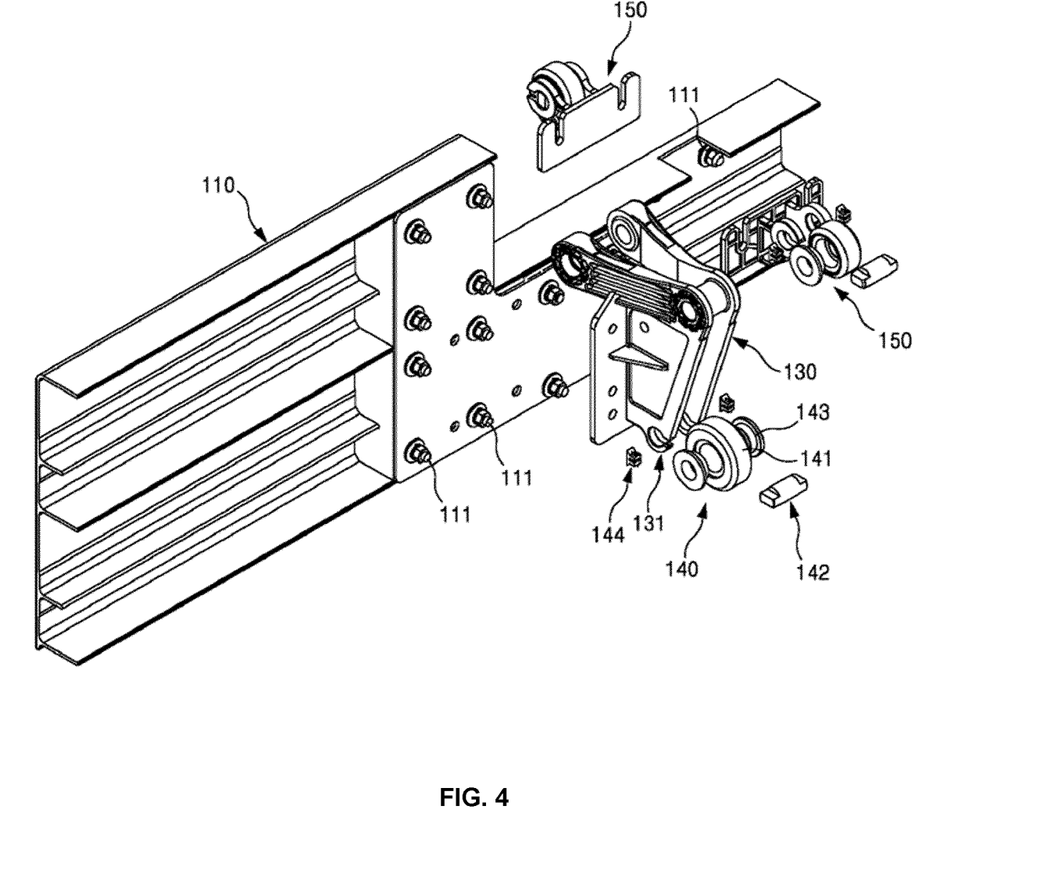
FIG. 4 is a rear exploded view of FIG. 2.
Figure 5:
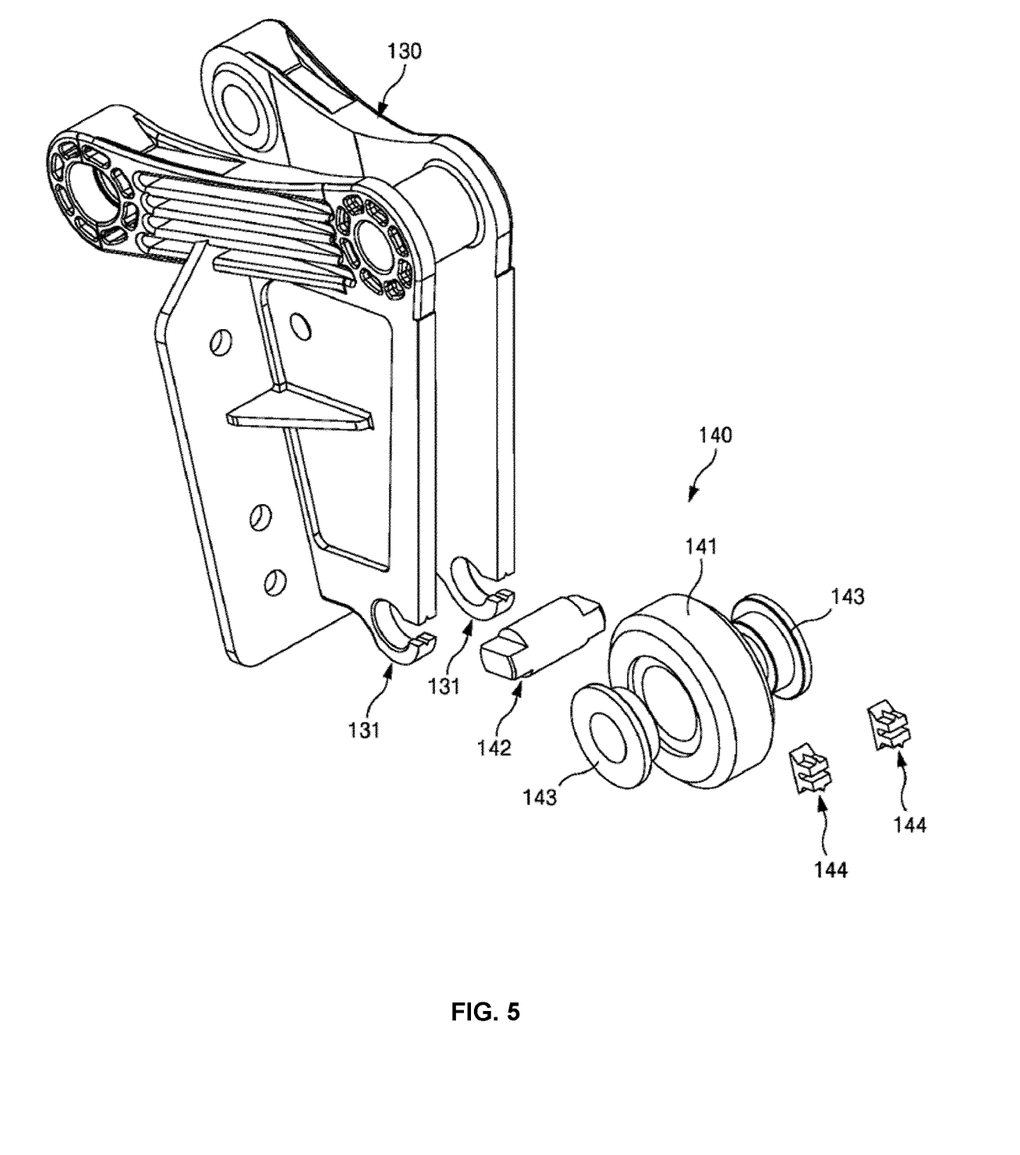
FIG. 5 is an exploded view of the attachment-integrated roller unit.
Figure 6:
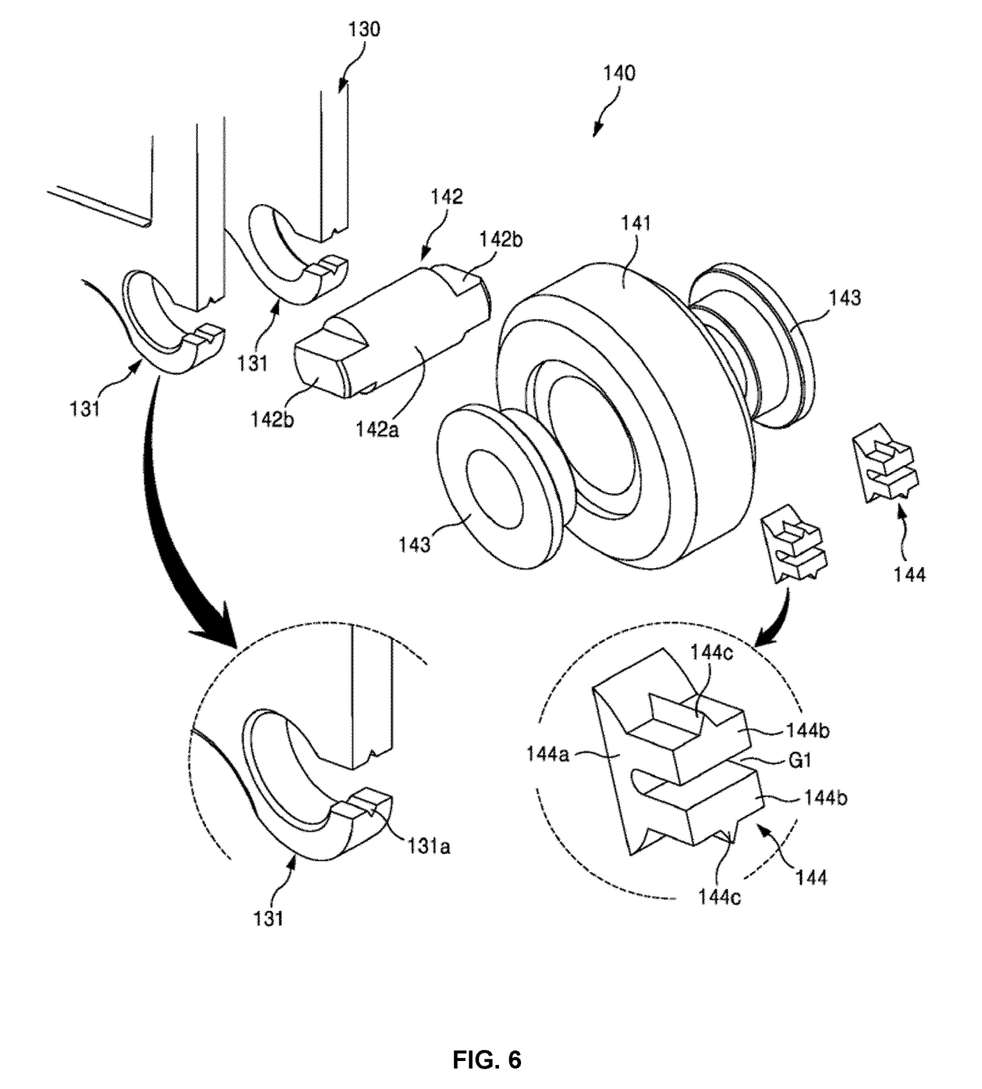
FIG. 6 is a partially enlarged view of FIG. 5.
Figure 7:
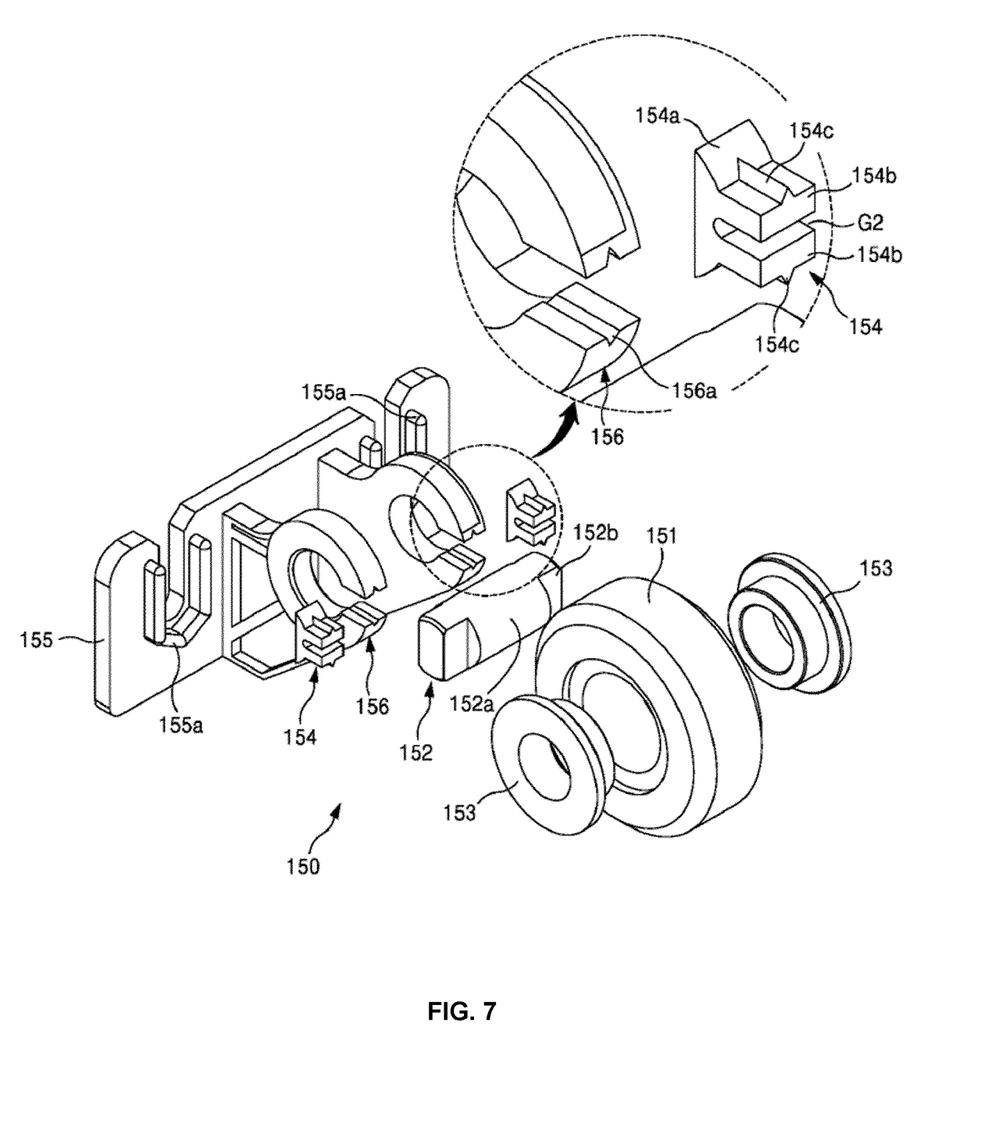
FIG. 7 is an exploded view of the carrier roller unit.
Figure 8:
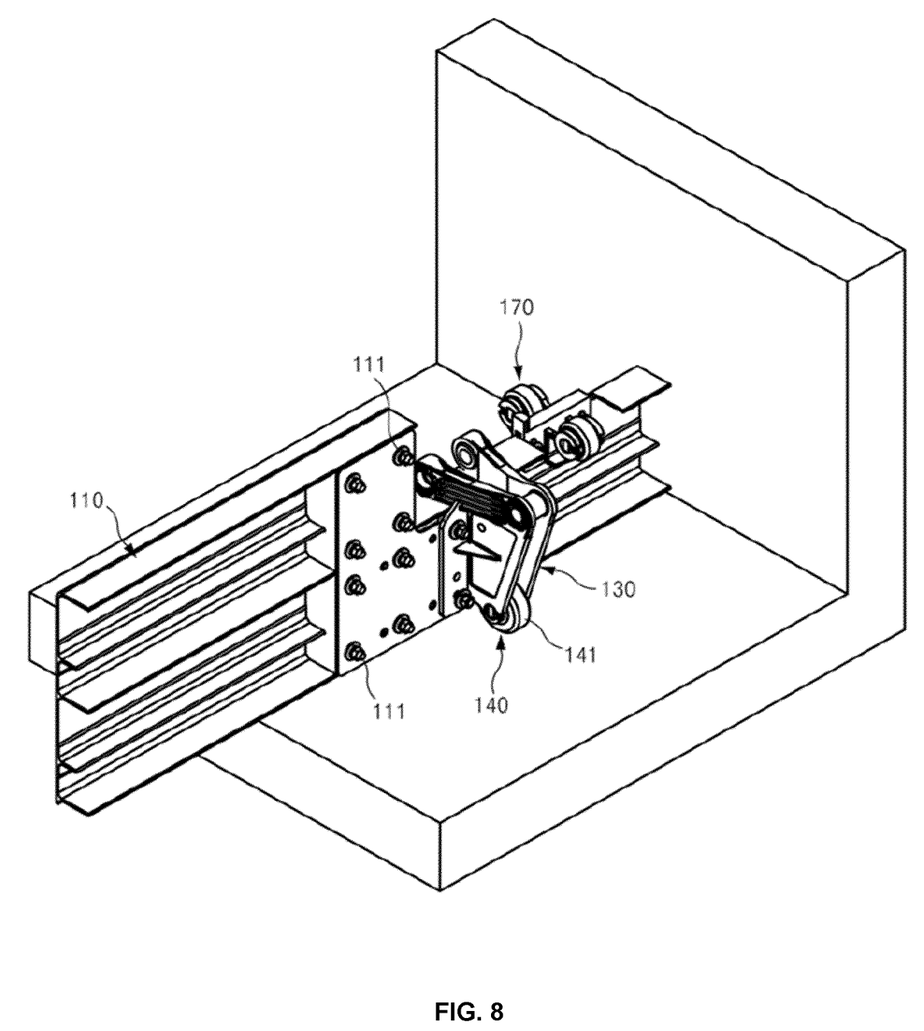
FIG. 8 is a use state view of a flight at the bottom of a settling basin.
Figure 9:
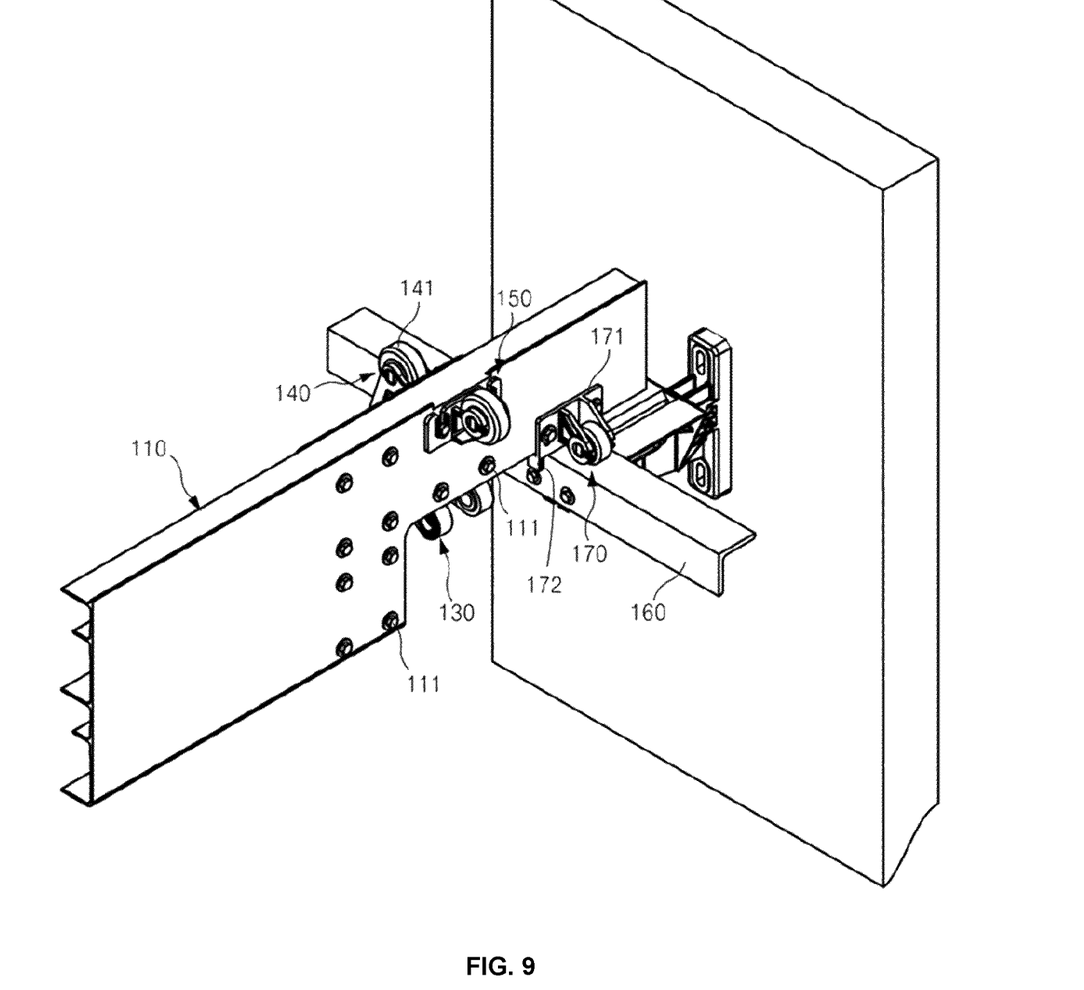
FIG. 9 is a use state view of the flight at the top of the settling basin.
Figure 10:
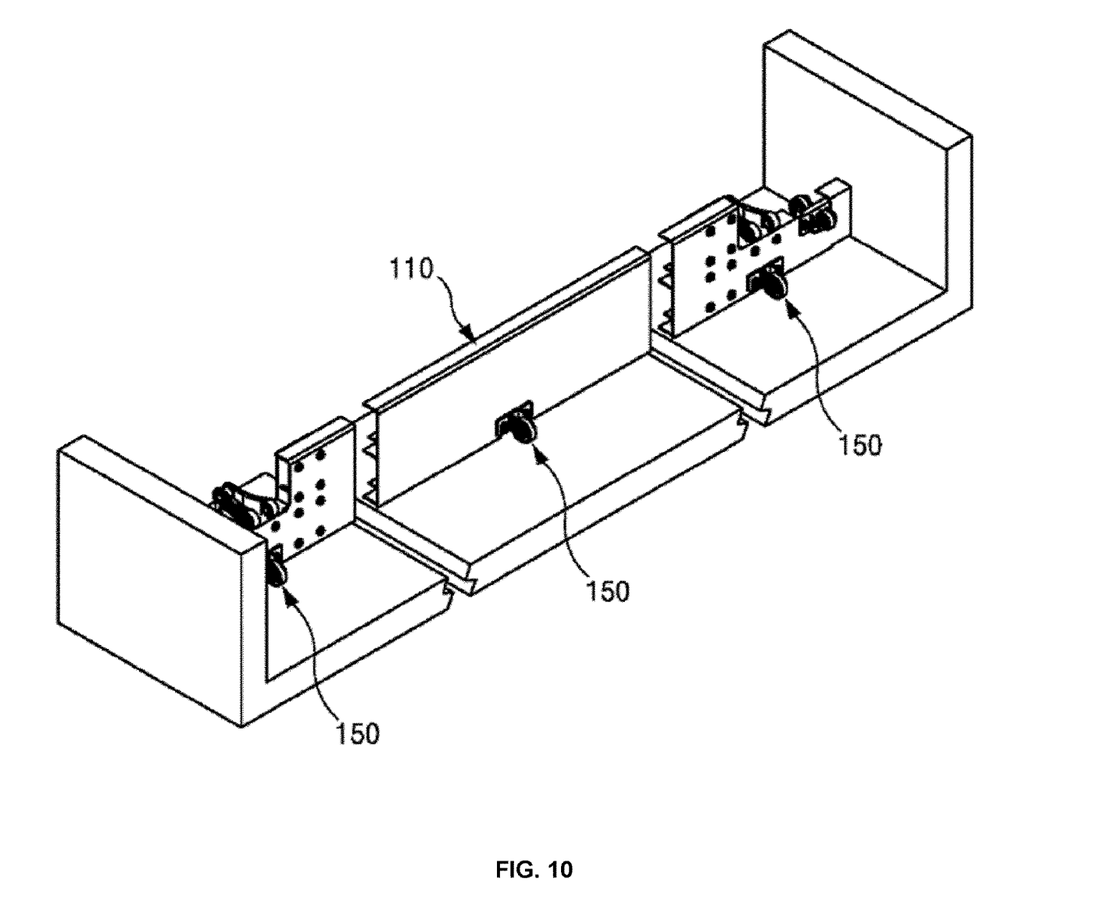
FIGS. 10 and 11 are use examples of the carrier roller unit.
Figure 11:
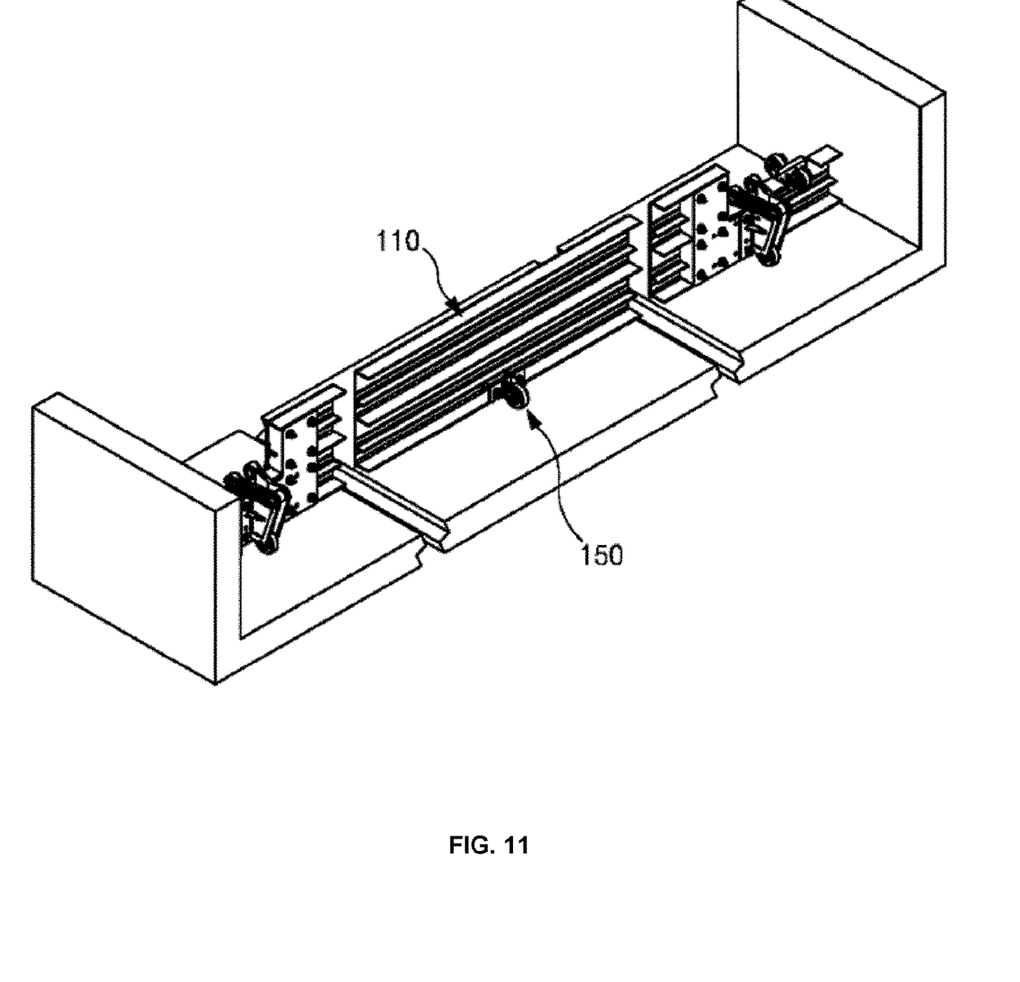

FIG. 1 is a structural view of a chain flight type sludge collector according to an embodiment of the present disclosure, FIG. 2 is a perspective view of a state in which an attachment-integrated roller unit and a carrier roller unit are coupled to a flight, FIG. 3 is a side view of FIG. 2, FIG. 4 is a rear exploded view of FIG. 2, FIG. 5 is an exploded view of the attachment-integrated roller unit, FIG. 6 is a partially enlarged view of FIG. 5, FIG. 7 is an exploded view of the carrier roller unit, FIG. 8 is a use state view of a flight at the bottom of a settling basin, FIG. 9 is a use state view of the flight at the top of the settling basin, and FIGS. 10 and 11 are use examples of the carrier roller unit.

Referring to the drawings, a chain flight type sludge collector according to the present embodiment may maintain an alignment state of a chain 120 by effectively preventing a flight 110 from being reversed, not only improve durability of the chain 120, but also save power by reducing an operating load of the chain and improving a shearing force thereof, which may allow the chain to achieve maximum performance and ensure stable operation, and also provide a faster construction period than a conventional sludge collector and solve all the problems caused by deformation of a wear strip by eliminating a work of constructing the wear strip on a bottom.

First, an overall structure of the chain flight type sludge collector according to the present embodiment will be schematically described with reference to FIG. 1.

The chain flight type sludge collector may include a plurality of flights 110 collecting sludge in a settling basin C, a chain 120 connected to the plurality of flights 110 to move the flights 110, and first and second driving units 101 and 102 disposed outside the settling basin C and providing power for driving the chain 120.

Although it is an embodiment, a civil structure of the settling basin C disclosed in the present embodiment may form a two-layered multilayer structure. Such a civil structure may be a form applied to a sewage treatment plant having a large amount of water treatment in spite of a small site.

As such, in the case in which the settling basin C forms the two-layered multilayer structure, sludge treatment may proceed in both a lower first layer region and an upper two-layer region. To this end, a large number of flights 110 may be disposed layer by layer.

Since the settling basin C does not have to form the two-layered multilayer structure, the scope of the present disclosure is not limited to the shape of the drawing. That is, even a single layer structure belongs to the scope of the present disclosure.

In the case in which the settling basin C forms the two-layered multilayer structure as in the present embodiment, the flights 110 are disposed on both the first layer and the second layer and treat the sludge while being moved through the chain 120 at the corresponding positions. Here, the sludge refers to a material having high specific gravity and high abrasion, including sand or slag.

Although not necessarily, the chain 120 applied to the present embodiment may be a non-metallic conveyor chain 120. For reference, since the settling basin C as shown in FIG. 1 varies depending on treatment capacity, but may be huge enough to reach a width of 8-10 m and a length of 20~120 m, it is preferable to apply the chain 120 as a metal, but excessive power is inevitably required.

Therefore, in order to reduce the power, it is necessary to reduce the weight of the parts, and to this end, it is preferable to apply the chain 120 as a non-metal as in the present embodiment. However, even for a simple non-metallic metal, such as a high strength engineering plastic, the limit thereof is around 3.8 tons. This is very low compared to 19 tons of a metal chain, but it is applicable in that the limit thereof is about 3 to 5 times of a safety factor required for actual use. Therefore, it may be preferable to apply the non-metallic conveyor chain 120 as in the present embodiment.

The non-metallic conveyor chain 120 is rotated by being individually connected to the first and second driving units 101 and 102, respectively, to move the flight 110. That is, one side of the non-metallic conveyor chain 120 is connected to the first driving unit 101 disposed on an outer one side of the settling basin C and rotated to move the flight 110 of the lower layer, and the other side of the non-metallic conveyor chain 120 is connected to the second driving unit 102 disposed on an outer other side of the settling basin C and rotated to move the flight 110 of the upper layer.

All of the flights 110 have a long rod structure. In addition, all of the flights 110 are each connected to the non-metallic conveyor chain 120, and may be moved during an operation of the non-metallic conveyor chain 120 to treat the sludge.

Meanwhile, as described above, due to the material or structural limitation in the application of the non-metallic conveyor chain 120, various problems, for example, various problems in which when the flight transports the sludge generated by gravity settling, the flight 110 is reversed, the durability of the parts is deteriorated, or the friction force between the flight 110, the shoe, and the wear strip is generated and thus, the durability of the parts is deteriorated may occur.

In order to effectively solve such problems, in the present embodiment, an attachment-integrated roller unit 140 and a carrier roller unit 150 are applied to the flight 110.

First, the attachment-integrated roller unit 140 will be described. The attachment-integral roller unit 140 is detachably coupled to an attachment 130 connected to the flight 110.

Since the attachment-integrated roller unit 140 guides the flight 110 when the flight 110 operates, the phenomenon in which the flight 110 is reversed may be prevented.

The attachment-integrated roller unit 140 includes a first roller 141 capable of performing a rolling movement, a first roller shaft 142 which forms a rotation shaft center of the first roller 141 and is coupled to a first shaft coupling portion 131 of the attachment 130, a pair of first bushings 143 coupled to both ends of the first roller 141, and a first shaft fixing member 144 coupled to the first shaft coupling portion 131.

The first roller 141 may be made of an elastic body such as urethane. As such, in the case in which the first roller 141 is made of the elastic body such as urethane, it is possible to maximize a rolling effect by reducing noise during driving and increasing friction with the bottom.

The first roller shaft 142 includes a first shaft body 142a having a circular cross-sectional shape disposed inside the first roller 141 to form the rotation shaft center of the first roller 141, and a pair of first coupling ends 142b having a non-circular cross-sectional shape formed at both ends of the first shaft body 142a.

The pair of first coupling ends 142b are inserted into the first shaft coupling portion 131 in a state in which a thickness of the insertion portion thereof is thin, and after insertion, the first roller shaft 142 is rotated and the first coupling ends 142b are thus rotated by 90 degrees so that the thickness of the insertion portion thereof is thick, thereby preventing the first roller shaft 142 from being randomly pulled out.

The first shaft fixing member 144 is coupled to the first shaft coupling portion 131, and serves to prevent the first roller shaft 142 from being separated from the first shaft coupling portion 131 and prevent of the rotation of the first roller shaft 142.

Such a first shaft fixing member 144 may include a first fixing plate 144a formed to be wider than an opening width of the first shaft coupling portion 131 and disposed in the first shaft coupling portion 131, a pair of first hooks 144b extending from the first fixing plate 144a, elastically provided by a gap G1 formed therein, and disposed at an inlet of the first shaft coupling portion 131, and a first engagement protrusion 144c formed on the first hook 144b and coupled to a first engagement groove 131a of the first shaft coupling portion 131.

Next, the plurality of carrier roller units 150 are detachably coupled to one side of the flight 110 along a forward direction of the flight 110.

Such carrier roller units 150 may be disposed in front of the attachment 130, and transports and guides the flight 110 toward a hopper (not shown) while advancing by directly contacting the bottom of the settling basin C (see FIG. 1) in the forward direction.

Since the carrier roller units 150 together with the attachment-integrated roller unit 140 guide the flight 110 when the flight 110 operates, the phenomenon in which the flight 110 is reversed may be prevented.

Many configurations of the carrier roller unit 150 are similar to the attachment-integrated roller unit 140. This will be described.

The carrier roller unit 150 includes a detachable unit bracket 155 detachably coupled to one side of the flight 110, a second roller 151 capable of performing rolling movement, a second roller shaft 152 which forms a rotation shaft center of the second roller 151 and is coupled to a second shaft coupling portion 156 of the detachable unit bracket 155, a pair of second bushings 153 coupled to both ends of the second roller 151, and a second shaft fixing member 154 coupled to the second shaft coupling portion 156.

The detachable unit bracket 155 is detachably coupled to the flight 110. In order for the detachable unit bracket 155 to be coupled to the flight 110 by position, the detachable unit bracket 155 is provided with a plurality of bracket pockets 155a, and the flight 110 is provided with a plurality of pocket supports 111. Since the flight 110 is provided with the plurality of pocket supports 111, the bracket pockets 155a of the detachable unit bracket 155 may be coupled to a desired position.

Similarly to the first roller 141 described above, the second roller 151 may be made of an elastic body such as urethane. As such, in the case in which the second roller 151 is made of the elastic body such as urethane, it is possible to maximize a rolling effect by reducing noise during driving and increasing friction with the bottom.

The second roller shaft 152 includes a second shaft body 152a having a circular cross-sectional shape disposed inside the second roller 151 to form the rotation shaft center of the second roller 151, and a pair of second coupling ends 152b having a non-circular cross-sectional shape formed at both ends of the second shaft body 152a.

The pair of second coupling ends 152b are inserted into the second shaft coupling portion 156 in a state in which a thickness of the insertion portion is thin, and after insertion, the second roller shaft 152 is rotated and the second coupling end 152b is thus rotated by 90 degrees so that the thickness of the insertion portion thereof is thick, thereby preventing the second roller shaft 152 from being randomly pulled out.

The second shaft fixing member 154 is coupled to the second shaft coupling portion 156, and serves to prevent the second roller shaft 152 from being separated from the second shaft coupling portion 156 and prevent of the rotation of the second roller shaft 152.

Such a second shaft fixing member 154 may include a second fixing plate 154a formed to be wider than an opening width of the second shaft coupling portion 156 and disposed in the second shaft coupling portion 156, a pair of second hooks 154b extending from the second fixing plate 154a, elastically provided by a gap G2 formed therein, and disposed at an inlet of the second shaft coupling portion 156, and a second engagement protrusion 154c formed on the second hook 154b and coupled to a second engagement groove 156a of the second shaft coupling portion 156.

Meanwhile, an existing way to ride the wear strip installed on a return rail may cause wear due to friction between the wear ring shoe on flight 110 and the wear strip attached to the return rail, and disconnection of the chain 120 and breakage of the flight 110 due to deformation by sewage or wastewater and petrochemicals.

Therefore, according to the present embodiment, also in an upper return rail 160, two rollers having the same shape as the carrier roller unit 150 are installed on the front and rear surfaces of the flight 110 such that a return roller unit 170 is applied to enable driving on the upper return rail 160 without the wear strip, thereby making it possible to prevent power loss due to the friction between the wear ring shoe and the wear strip and the disconnection of the chain 120 due to deformation of the wear strip and the damage to the flight 110.

In the application of the return roller unit 170, a form in which after installing the detachable unit bracket applied to the carrier roller unit 150, the rollers are applied to both sides thereof may also be used.

Meanwhile, in order to prevent the derailment of the return roller unit 170 driving on the return rail 160, a return rail guide 161 (see FIGS. 2, 3 and 9) may be provided. The return rail guide 161 prevents the flight 110 from being separated from the return rail 160 due to left and right shake and eccentric driving.

Such a return rail guide 172 may be provided separately from the return roller unit 170 and inserted into a corresponding position at the time of assembly so that the return rail guide 172 may be fixed together to a fixing bolt of the return roller unit 170, but may also be manufactured integrally with an unit bracket 171 of the return roller unit 170 as shown in FIG. 9.

Meanwhile, as shown in FIGS. 10 and 11, in a case in which a width of the settling basin is excessively wide, in order to prevent sagging of the flight 110 while preventing power loss by the friction with the bottom due to the sagging of the flight 110, the problem may be solved by additionally attaching the carrier roller unit 150 to the center, front surface, and rear surface of the flight 110.

Meanwhile, a concrete surface of a bottom surface of the settling basin of an old sewage treatment plant may be corroded by the sewage or wastewater, thereby making the roller units difficult to proceed, and in this case, selectively installing additional wear strips at the bottom of the sewage treatment plant may be considered.

According to the present embodiment having the structure and operation as described above, an alignment state of a chain 120 may be maintained by effectively preventing the flight 110 from being reversed, not only durability of the chain 120 may be improved, but also power may be saved by reducing an operating load of the chain and improving a shearing force thereof, which may allow the chain to achieve maximum performance and ensure stable operation, and a faster construction period than a conventional collector sludge may be provided and all the problems caused by deformation of the wear strip may be solved by eliminating a work of constructing the wear strip on the bottom.

According to the present disclosure, the alignment state of the chain may be maintained by effectively preventing the flight from being reversed, not only the durability of the chain may be improved, but also the power may be saved by reducing the operating load of the chain and improving the shearing force thereof, which may allow the chain to achieve the maximum performance and ensure stable operation, and the faster construction period than the conventional sludge collector may also be provided and all the problems caused by deformation of the wear strip may be solved by eliminating the work of constructing the wear strip on the bottom.

As described above, the present disclosure is not limited to the described embodiments, and it will be apparent to those skilled in the art that various modifications and variations may be made without departing from the spirit and scope of the present disclosure. Therefore, such modifications or variations are included in the claims of the present disclosure.

What is claimed is:

1. A sludge collector comprising:
a plurality of flights collecting sludge in a settling basin;
a chain connected to the plurality of flights to move the flights; and
an attachment-integrated roller unit detachably coupled to an attachment connected to the flights,
wherein the attachment-integrated roller unit includes a first roller capable of performing rolling movement, a first roller shaft which forms a rotation shaft center of the first roller and is coupled to a first shaft coupling portion of the attachment, a pair of first bushings coupled to both ends of the first roller, and a first shaft fixing member coupled to the first shaft coupling portion,
wherein the first shaft fixing member includes a first fixing plate formed to be wider than an opening width of the first shaft coupling portion and disposed in the first shaft coupling portion, a pair of first hooks extending from the first fixing plate, elastically provided by a gap formed therein, and disposed at an inlet of the first shaft coupling portion, and a first engagement protrusion formed on the first hook and coupled to a first engagement groove of the first shaft coupling portion.

2. The sludge collector of claim 1, wherein the first roller is made of a urethane elastic body, and the first roller shaft includes:
a first shaft body having a circular cross-sectional shape disposed inside the first roller to form the rotation shaft center of the first roller; and
a pair of first coupling ends having a non-circular cross-sectional shape formed at both ends of the first shaft body.

3. The sludge collector of claim 1, further comprising at least one carrier roller unit coupled to the flights in close proximity to the attachment-integrated roller unit to guide the operation of the flights, together with the attachment-integrated roller unit when the flights are operated.

4. The sludge collector of claim 3, wherein the carrier roller unit includes:
a detachable unit bracket detachably coupled to one side of the flights;
a second roller capable of performing rolling movement;
a second roller shaft which forms a rotation shaft center of the second roller and is coupled to a second shaft coupling portion of the detachable unit bracket;
a pair of second bushings coupled to both ends of the second roller; and
a second shaft fixing member coupled to the second shaft coupling portion.

5. The sludge collector of claim 4, wherein the detachable unit bracket is provided with a plurality of bracket pockets, and the flights are provided with a plurality of pocket supports coupled to and supported by the plurality of bracket pockets.

6. The sludge collector of claim 3, wherein when a width of the settling basin is excessively wide, in order to prevent sagging of the flights while preventing power loss by friction with a bottom due to the sagging of the flights, the carrier roller units are disposed on the center, front surface, and rear surface of the flights, respectively.

7. The sludge collector of claim 1, further comprising a return roller unit installed at an intersection portion of the flights and a return rail to drive on the return rail when the flights return and,
a return rail guide is provided to a side of the flights to prevent derailment of the return roller unit driving on the return rail.

8. The sludge collector of claim 7, wherein the return rail guide is provided separately from the return roller unit and inserted into a corresponding position at the time of assembly so that the return rail guide is fixed together to a fixing bolt of the return roller unit or is provided integrally with the return roller unit.

9. The sludge collector of claim 1, wherein a wear strip is further installed on a bottom surface of the settling basin.

* * * * *